United States Patent [19]

Fitzpatrick et al.

[11] Patent Number: 5,608,860
[45] Date of Patent: Mar. 4, 1997

[54] METHOD AND APPARATUS FOR MULTIPLE SOURCE AND TARGET OBJECT DIRECT MANIPULATION TECHNIQUES

[75] Inventors: Greg P. Fitzpatrick, Keller; Thom R. Haynes, Euless, both of Tex.

[73] Assignee: International Business Machines Corporation, Armonk, N.Y.

[21] Appl. No.: 610,768

[22] Filed: Mar. 4, 1996

Related U.S. Application Data

[63] Continuation of Ser. No. 318,595, Oct. 6, 1994, abandoned.
[51] Int. Cl.$^6$ .................................................. G06F 3/14
[52] U.S. Cl. ............................................ 395/352; 395/326
[58] Field of Search .................................... 395/155, 156, 395/157, 158, 159, 160, 161, 164

[56] References Cited

U.S. PATENT DOCUMENTS

| 5,062,060 | 10/1991 | Kolnick | 395/159 |
| 5,231,578 | 7/1993 | Levin et al. | 364/419.1 |
| 5,251,294 | 10/1993 | Abelow | 395/155 |
| 5,297,250 | 3/1994 | Leroy et al. | 395/157 |
| 5,414,848 | 5/1995 | Sandage et al. | 395/650 |

OTHER PUBLICATIONS

Schell, D. J. 'Drag and Drop Available Target Indicator' Research Disclosure n 341, Sep. 1992.
Alford Jr., J. A. et al. 'Pockets for Drag and Drop Operations' Research Disclosure n 345, Jan. 1993.
Johnson, W. J. et al. 'Methodology for Marking Objects using a Polar Coordinate Point and Shoot Cursor' IBM Technical Disclosure Bulletin, n 6, Nov. 1992, pp. 310–311.

Primary Examiner—Mark R. Powell
Assistant Examiner—Ruay Lian Ho
Attorney, Agent, or Firm—A. Bruce Clay

[57] ABSTRACT

In a multi-windowed environment, a direct manipulation technique adds the ability to add and delete source objects and target objects to a direct manipulation list. After the direct manipulation operation has begun, a group object is formed. The group object may be positioned proximate without being dropped or released another object which may be a source or a target object. Upon passage of a predetermined period of time, a menu will open allowing selection of an appropriate option to add to or delete from the group object.

18 Claims, 6 Drawing Sheets

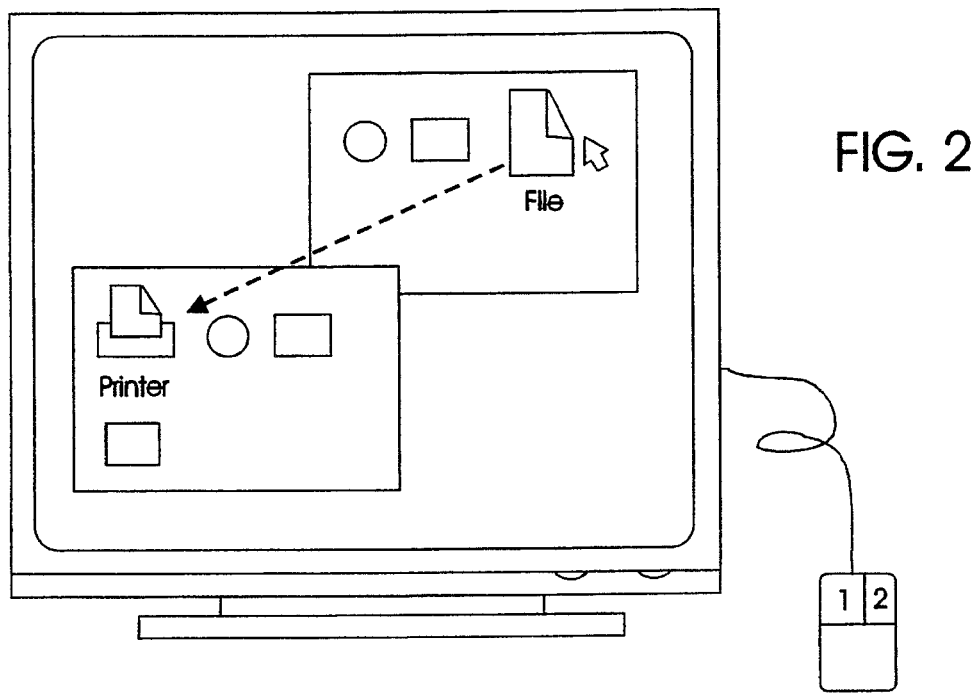
FIG. 2
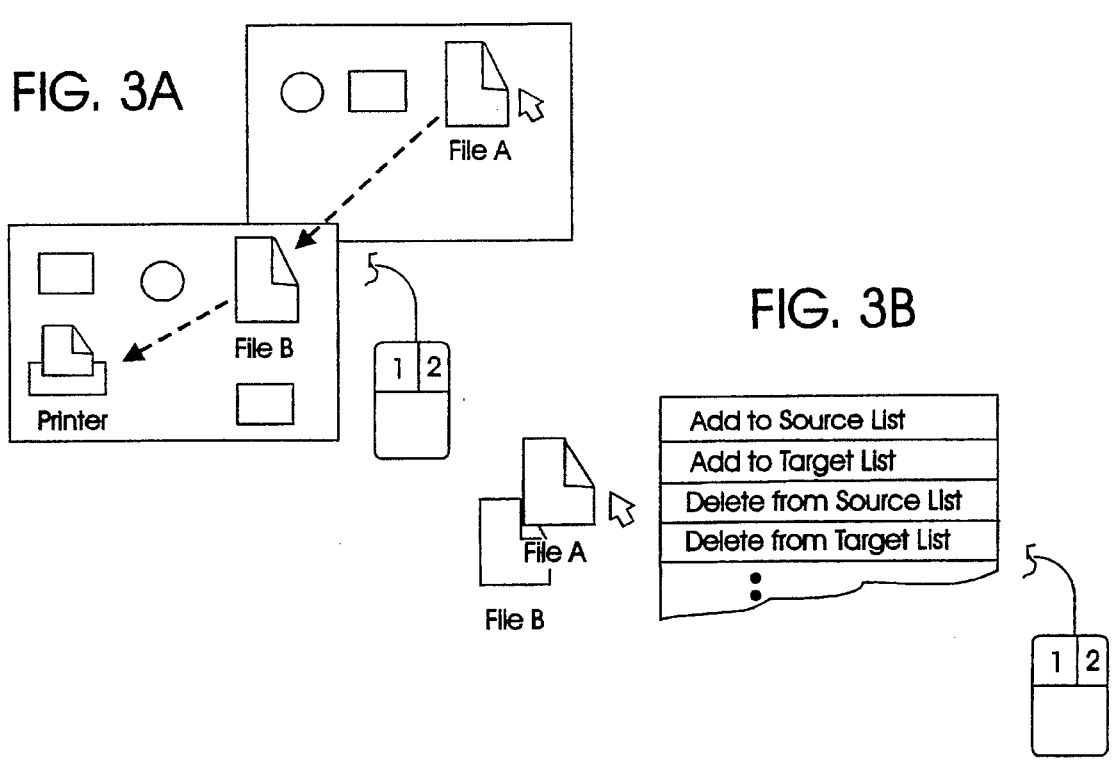
FIG. 3A
FIG. 3B

5,608,860

METHOD AND APPARATUS FOR MULTIPLE SOURCE AND TARGET OBJECT DIRECT MANIPULATION TECHNIQUES

This is a continuation of application Ser. No. 08/318,595 filed Oct. 5, 1994, abandoned.

TECHNICAL FIELD OF THE INVENTION

This invention relates in general to computer software, and in particular to a method and apparatus for adding and deleting objects from a source list and a target list across windows.

BACKGROUND OF THE INVENTION

Direct manipulation operations have greatly assisted the ease of use of computers. Direct manipulation operations include such things as "dragging", in which all or part of a display group in a display space is moved in such a way that the group continuously follows the pointer as though it were attached thereto, and "dropping", in which the display group is added to another display group in the display space. Such drag and drop operations are used, for example, to drag a file to a printer and, upon dropping the file onto the printer, print the file. Similar operations are used to dispose of files, place a plurality of items into a single file, etc.

Although drag and drop operations are relatively simple in comparison to prior keyboard techniques, there is still some difficulty whenever more than one source item is required to be dropped onto a target. Similarly, whenever one or more source items must be dropped onto more than one target, the operations required may become lengthy and repetitive.

One attempted resolution to the problem of dragging multiple source items to a single target has involved the use of a special augmentation key. A specially designated key on the keyboard is first used and then, while holding the key, all the objects which are to be moved are designated with the mouse pointer. The special key is then released and any one of the designated objects is dragged and dropped onto the target. The movement of any one of the source objects to the target takes all the designated source objects with it. However, this method does not allow the ability to add to or delete from the source objects once the direct manipulation begins. Additionally, there is no way in the current methods to add to or delete from selected objects not in the currently active window. Also, there is no way in the current art to add to or delete objects from a target list. Thus, there is a need for a method and apparatus for allowing cross-window multiple source and target list manipulations.

SUMMARY OF THE INVENTION

The present invention disclosed herein comprises a method and apparatus for multiple source and target object direct manipulation techniques which substantially reduces or eliminates problems associated with prior multiple object manipulation. The present invention allows the manipulation of multiple target and source objects without the need for multiple single operations.

In accordance with one aspect of the present invention, in a multi-windowed electronic data processing system in which a direct manipulation operation has been initiated with at least one source object selected to create a direct manipulation list, a method selectively adds and deletes objects from the list prior to completion of the direct manipulation operation. A group object comprising all objects on the direct manipulation list is created. The group object is hovered (ie., positioned over or near without being released onto) at least one other object for a predetermined period of time while continuing to select the group object. After the predetermined period of time, a menu is automatically opened. The menu comprises a plurality of selectable options including at least 'add to the list' and 'delete from the list.' At least one of the plurality of selectable options is designated while continuing to select the group object. The direct manipulation operation is then continued.

It is a technical advantage of the present invention that multiple targets and source objects may be added to or deleted from a direct manipulation operation once the operation has commenced.

BRIEF DESCRIPTION OF THE DRAWINGS

For a more complete understanding of the present invention and for further advantages thereof, reference is now made to the following Detailed Description taken in conjunction with the accompanying drawings, in which:

FIG. 2 illustrates the prior art;

FIGS. 3A and 3B are graphical illustrations of one embodiment of the present invention;

DETAILED DESCRIPTION OF THE INVENTION

Figure 1:
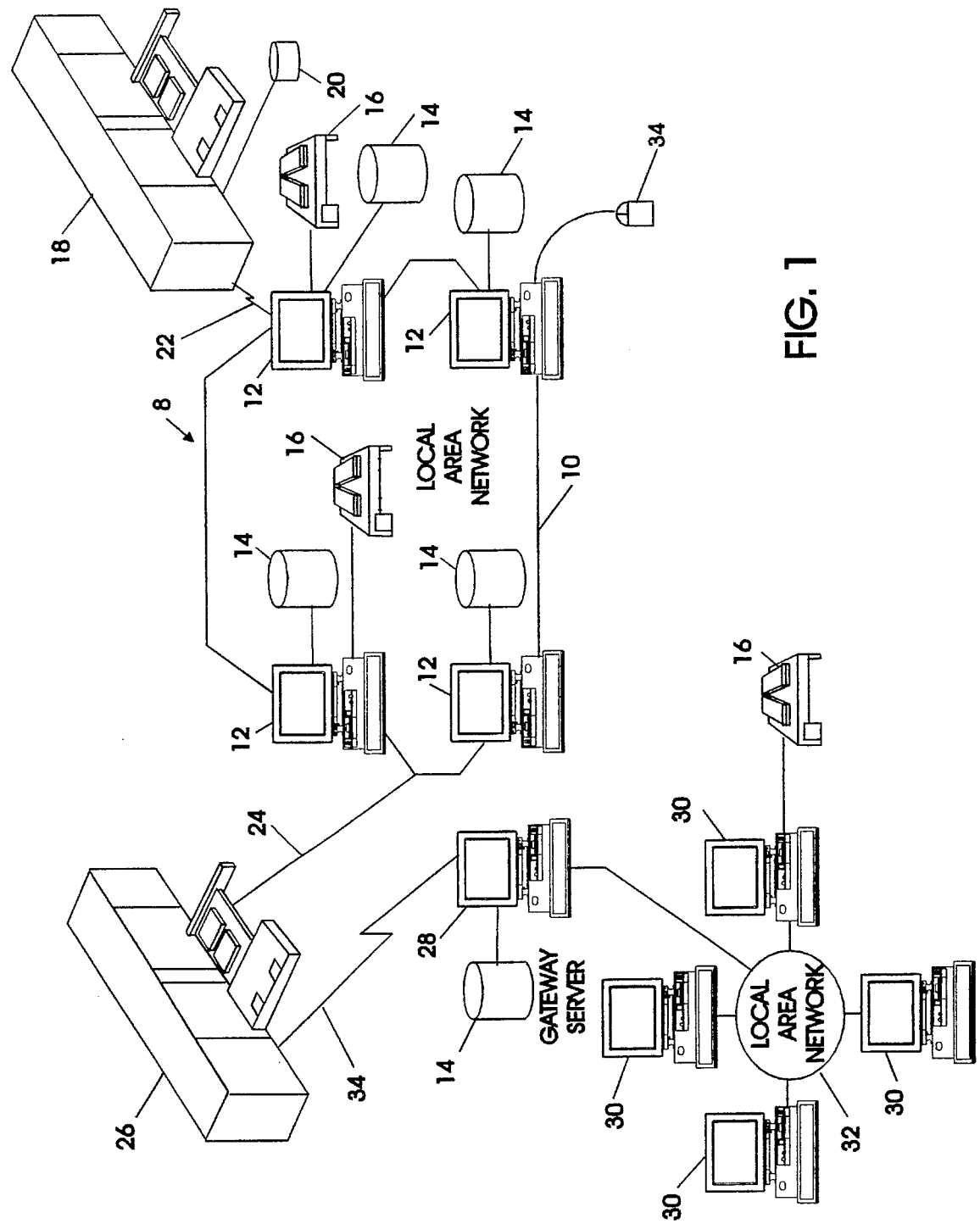
FIG. 1 is a schematic illustration of a data processing system in accordance with the present invention.

Referring to FIG. 1, there is depicted a graphical representation of a data processing system 8, which may be utilized to implement the present invention. As may be seen, data processing system 8 may include a plurality of networks, such as local area networks (LAN) 10 and 32, each of which preferably includes a plurality of individual computers 12 and 30, respectively. Of course, those skilled in the art will appreciate that a plurality of intelligent workstations (IWS) coupled to a host processor may be utilized for each such network. As is common in such data processing systems, each individual computer may be coupled to a storage device 14, a printer/output device 16, and a mouse controller 36.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a subsystem control unit/communications controller 26 and communications link 34 to a gateway server 28. Gateway server 28 is preferably an individual computer or IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and, similarly, LAN 10 may be located a substantial distance from LAN 32. For example, LAN 32 may be located in California while LAN 10 may be located within Texas and mainframe computer 18 may be located in New York.

Referring next to FIG. 2, a monitor 40, such as used with computers 12 and 30 (see FIG. 1), is shown. The monitor 40 has shown thereon overlapping windows 42 and 44. Window 42 may include, for example, a plurality of icons such as Printer icon 46. Window 44 may also include, for example, a plurality of icons such as File folder icon 48. It is possible to use a drag and drop direct manipulation operation to drag the File icon 48 from window 44 and drop it onto the Printer icon 46 in window 42. By placing a mouse cursor 50 over the file icon 48 and holding down mouse button 2, as indicated by reference numeral 52 on a mouse controller 54, the File folder 48 becomes "attached" to the mouse pointer 50. As is well-known, the mouse controller 54 is then moved in order to transpose the File icon 48 to the Printer icon 46 such as, for example, along the dashed line 56. The contents of the File icon 48 will then be printed by the printer represented by Printer icon 46.

Referring next to FIGS. 3A and 3B, one embodiment of the present invention is illustrated. Similar to the overlapping windows 42 and 44 shown on monitor 40 of FIG. 2, overlapping windows 60 and 62 are illustrated. Again, for example, window 60 may be provided with a plurality of icons including Printer icon 64 and File B folder icon 66. Window 62 may be provided with, for example, a plurality of icons including File A folder icon 68. If a user desires to drop File A folder icon 68 and File B folder icon 66 on the Printer icon 64, the present invention provides an easy method for so doing. By positioning a mouse cursor 70 onto the File A folder icon 68 and depressing and holding mouse button 2, as indicated by reference numeral 72 on mouse controller 74, the icon 68 is selected and placed on a source list portion of a direct manipulation list, as is generally known in the art. The operator may then move icon 68 generally in a direction indicated by a dashed line 76, onto the overlapping window 60. Upon reaching icon 66, the operator may position icon 68 over icon 66 while maintaining depression of mouse button 72. By "hovering" icon 68 over icon 66 for a user or system-defined period of time while maintaining depression of mouse button 72, a pop-up menu, as generally indicated by reference numeral 78, will appear. It is then possible to select an item from the menu 78 by using any appropriate method such as, for example, while continuing to hold mouse button 2, moving the mouse cursor 70 onto the desired selection and clicking thereon by depressing mouse button 1, as identified by reference numeral 80. In the example as shown in FIG. 3B, the selection from menu 78 would be "ADD TO SOURCE LIST" 82. By designating selection 82, icon 66 is added to the source list portion of the direct manipulation list and thus allowing icon 66 and icon 68 to be collectively manipulated as a group icon 69. Icon 66 and icon 68 are then moved as the group icon 69 in a general direction indicated by dashed line 84 and dropped upon Printer icon 64. By so doing, the file data, as represented by icon 68 and icon 66, will be printed on the printer which is represented by icon 64. Therefore, multiple objects from separate windows are directly manipulated in a single direct manipulation operation.

Obviously, it would be possible to provide various other options to the menu 78 to enhance operation of the present invention. For example, items on the menu 78 could be "grayed-out" if not available or an incorrect choice. If the icon being added to the list is already on the list, one would not need to add it again. Similarly, a cascading menu or list upon selecting "DELETE FROM SOURCE LIST" 83 (or "DELETE FROM TARGET LIST") would allow a user to select which of a plurality of icons was to be deleted.

Figure 4A:
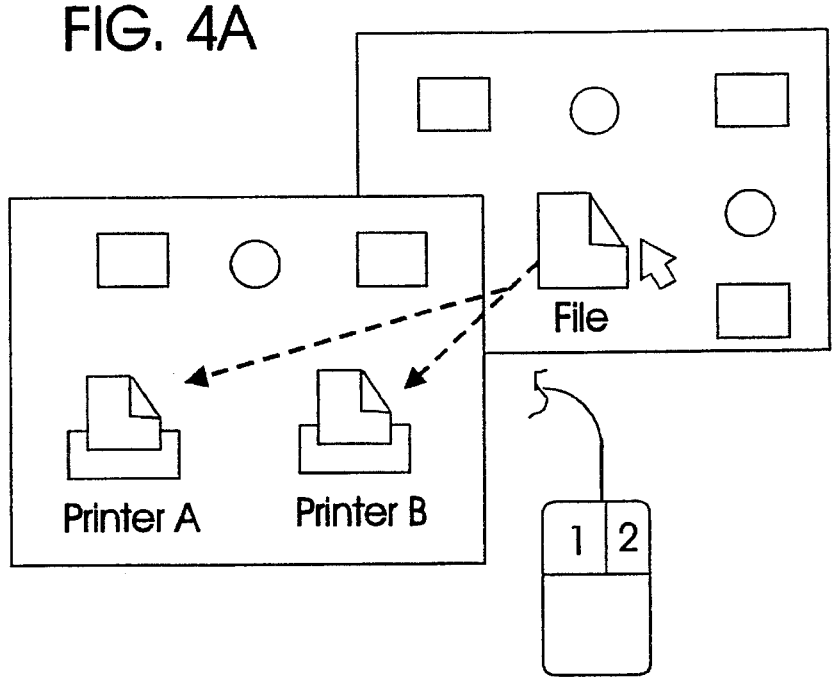
FIGS. 4A, 4B, and 4C are further graphical illustrations of the present invention.
Figure 4B:
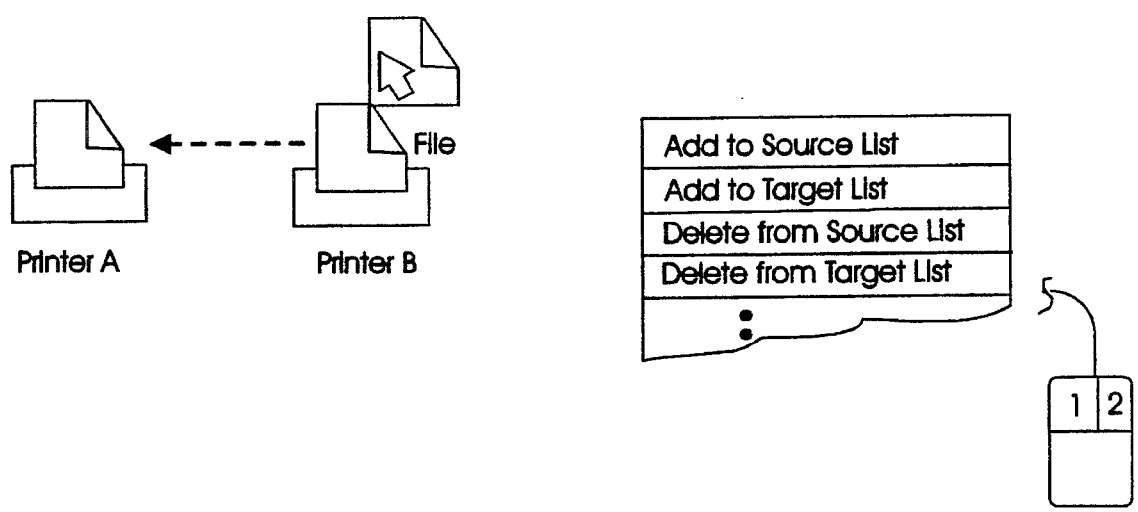

Referring to FIGS. 4A and 4B, a further embodiment of the present invention is illustrated. Overlapping windows 90 and 92 are shown. Window 90 may include a plurality of icons such as, for example, Printer A icon 93 and Printer B icon 94. Window 92 may also include a plurality of icons such as, for example, File folder icon 96. By depressing mouse button 2, as indicated by reference numeral 98 on a mouse control 100, a mouse pointer 102 may be "attached" to the icon 96. The present invention allows the contents of File folder icon 96 to be printed by the printers represented by Printer A icon 93 and Printer B icon 94.

Referring to FIG. 4B, the File icon 96 has been dragged, generally in a direction indicated by dashed line 104, across the overlapping windows 92 and 90 to be positioned adjacent the Printer B icon 94. Upon "hovering" icon 96 over icon 94 for a predetermined amount of time, a pop-up menu, generally indicated by reference numeral 106, will appear. As previously discussed above, it is possible to select from the menu 106 with the mouse pointer 102 while continuing to depress mouse button 98. Then depressing mouse button 1, as indicated by reference numeral 108, the desired selection may be made from the menu 106. For example, "ADD TO TARGET LIST" selection 110 may be thus made which adds icon 94 to a target list portion of the direct manipulation list. While continuing to depress mouse button 98, icons 96 and 94 (collectively forming a group object icon 101) may then be dragged in a direction generally indicated by the dashed line 112 onto the Printer A icon 93. Once icon 96 and icon 94 are dropped on icon 93, the contents of icon 96 will be printed on the printers represented by icons 93 and 94.

Figure 4C:
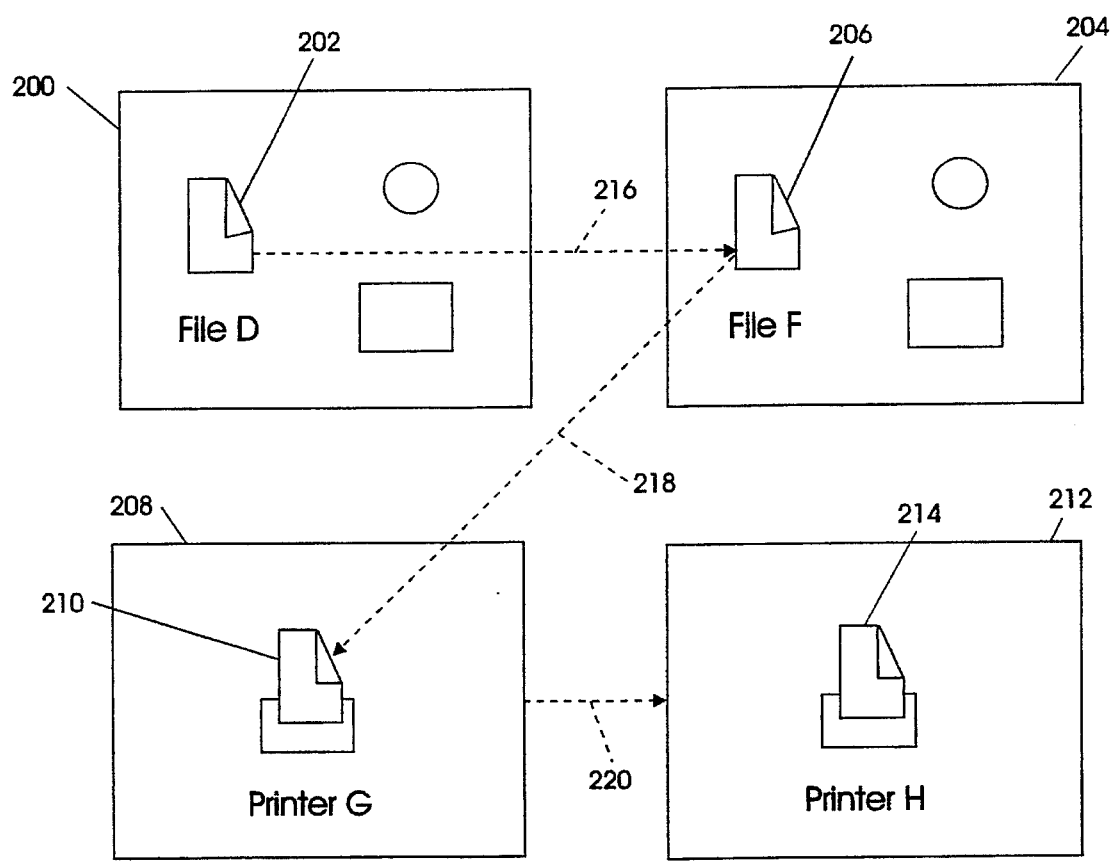
Figure 5:
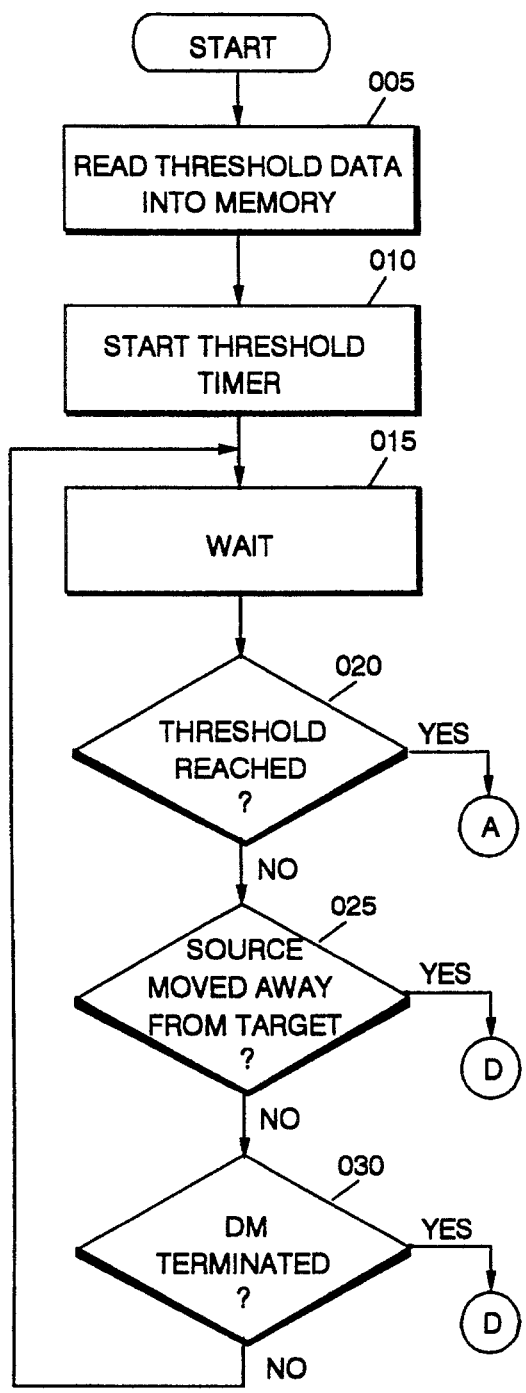
FIGS. 5, 6, 7, and 8 are flow diagrams illustrating the present invention.

Referring to FIG. 4C, a still further embodiment of the present invention is shown. A plurality of windows (which may overlap or not) is shown and may include, for example, window 200 with at least a File D folder icon 202, window 204 with at least a File F folder icon 206, window 208 with at least a Printer G icon 210, and window 212 with at least a Printer H icon 214. In accordance with the present invention, it is possible to, for example, drag icon 202 generally along a line 216 and collect icon 206. Icons 202 and 206 may then be dragged together generally along a line 218 to a first target, icon 210. The icons 202, 206, and 210 may be dragged generally along a line 220 to a second target, icon 214. Upon dropping the icons 202, 206, and 210 onto icon 214, the contents of File D folder icon 202 and File F folder icon 206 will be printed by each of the printers represented by Printer G icon 210 and Printer H icon 214.

It will be apparent to one skilled in the art that other actions may be conducted in the same manner as shown in reference to FIGS. 3A, 3B, 4A, 4B, and 4C above. For example, source objects may be deleted from a designated source list, and targets may be deleted from a designated target list by using the present invention.

Referring to FIGS. 5, 6, 7, and 8, flow diagrams illustrate the present invention. After starting at 120, threshold data is read into memory at block 122 (as used herein, start means that this facet of a direct manipulation operation has started and that a source object(s) is already being dragged but has not been dropped onto a target object). A threshold timer is started at block 124. The threshold timer is used in conjunction with the present invention to indicate whether a predetermined "hovering" time has been reached in order to trigger the pop-up menu as disclosed above. The present invention then waits at block 126 until it is determined whether or not the threshold has been reached at decision block 128. If the response to decision block 128 is yes, the present invention proceeds to "A" which will be discussed in greater detail in conjunction with FIG. 6. If the response to decision block 128 is no, it is determined at decision block 130 whether or not the source has moved away from the target (i.e., the user decided against adding the source to the target). If the response to decision block 130 is yes, the present invention ends at D (see FIG. 8). If the response to decision block 130 is no, it is determined at decision block 132 whether or not the direct manipulation operation is terminated. If the response to decision block 132 is yes, the present invention ends at E (see FIG. 8). If the response to decision block 132 is no, the present invention returns to wait at block 126, as previously described above.

Figure 6:
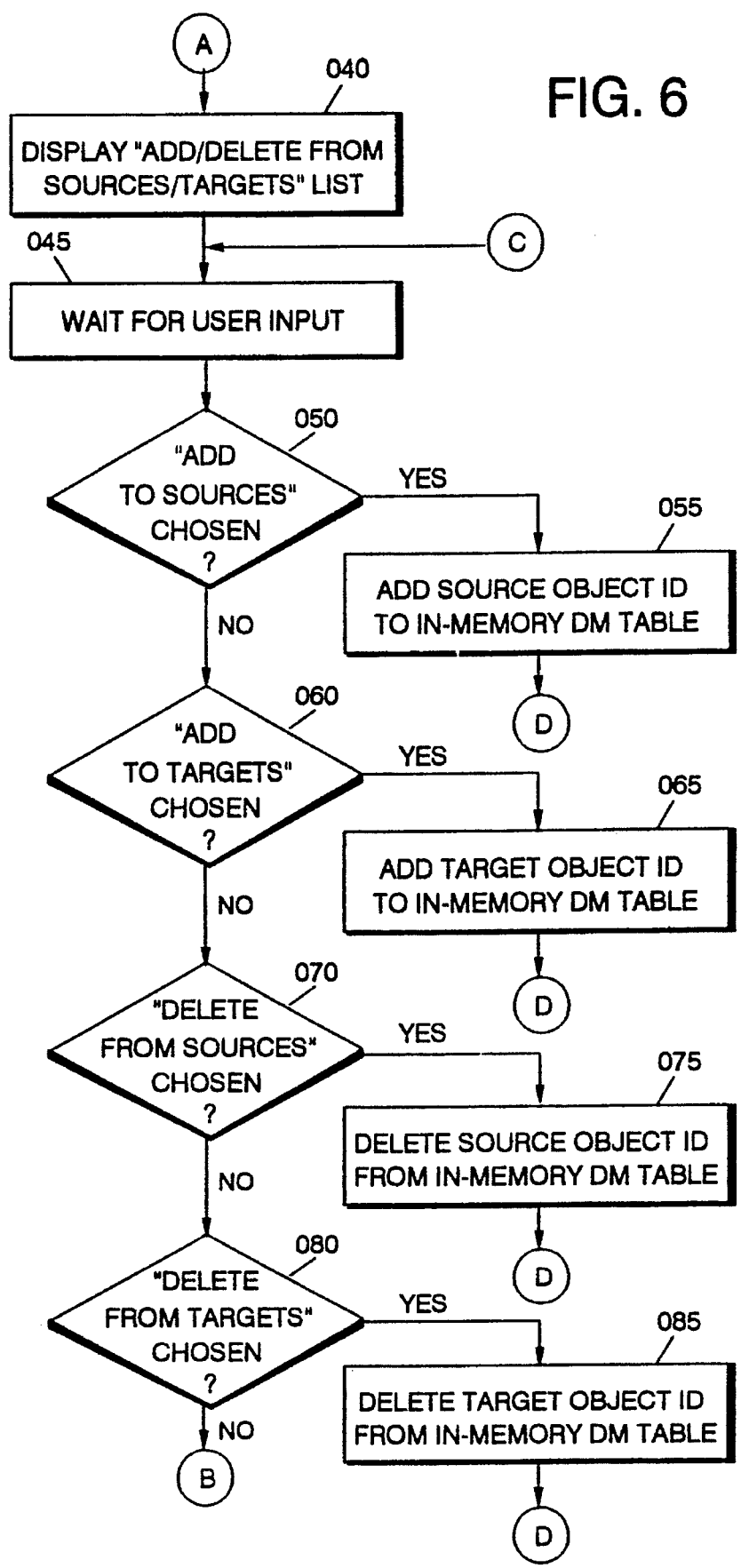

Referring to FIG. 6, if it is determined at decision block 128 that the threshold time has been reached, the present invention will display an appropriate pop-up menu at block 134. The pop-up menu will provide such choices as being able to add/delete from the sources/targets list. The present invention then waits for user input at block 136 followed by a determination at decision block 138 whether or not the choice is to "ADD TO SOURCES". If the response to decision block 138 is yes, the source object identification is added to an in-memory Direct Manipulation Table at block 142. The present invention then ends at D.

If the response to decision block 138 is no, it is determined at decision block 144 whether or not the choice is "ADD TO TARGETS". If the response to decision block 144 is yes, the target object identification is added to the In Memory Direction Manipulation Table at block 146. The present invention then ends at D.

If the response to decision block 144 is no, it is determined at decision block 147 whether or not the choice is to "DELETE FROM SOURCES". If the response to decision block 147 is yes, the source object identification is deleted from the in-memory Direct Manipulation Table at block 148. The present invention then ends at D.

If the response to decision block 147 is no, it is determined at decision block 150 whether or not the choice is "DELETE FROM TARGETS". If the response to decision block 150 is yes, the target objects identification is deleted from the in-memory Direct Manipulation Table at block 152. The present invention then ends at D.

Figure 7:
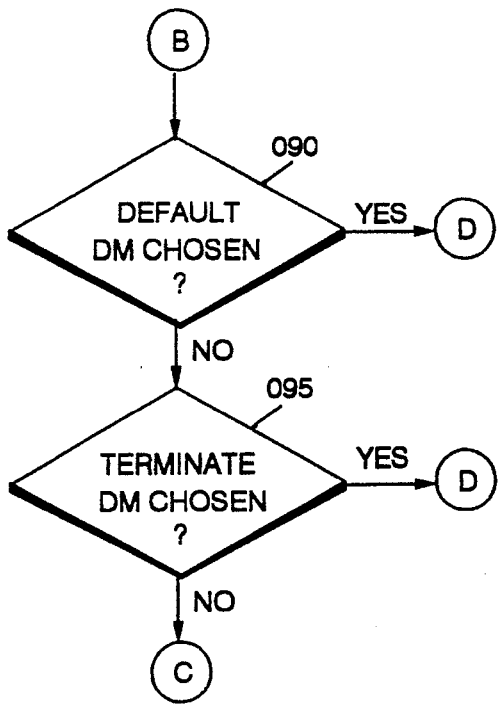

If the response to decision block 150 is no, the present invention proceeds to "B" as shown in FIG. 7 where it is determined at decision block 154 whether or not the default direct manipulation action is chosen. If the response to decision block 154 is yes, the present invention ends at E. If the response to decision block 154 is no, it is determined at decision block 156 whether or not a termination of the direct manipulation has been chosen. If the response to decision block 156 is yes, the present invention ends at E. If the response to decision block 156 is no, the present invention proceeds to "C" which is a return to block 136, as shown in FIG. 6, in which the present invention waits for user input.

Figure 8:
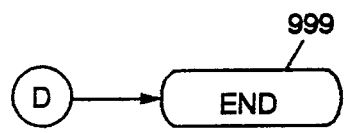

Referring to FIG. 8, "D" and "E" are further described. When the flow diagrams in FIGS. 5 and 6 indicate an end at "D", it is meant that only the current facet of the direct manipulation operation is ended. In contrast, when the flow diagrams in FIGS. 5 and 7 indicate an end at "E", it is meant that the entire direct manipulation operation is ended.

Although the present invention has been particularly shown and described with reference to a preferred embodiment, it will be understood by those skilled in the art that various changes in form and detail may be made without departing from the spirit and the scope of the invention.

What we claim is:

1. In a multi-windowed electronic data processing system in which a drag and drop operation has been initiated with at least one source graphical object selected to create a direct manipulation list, a method of selectively adding and deleting graphical objects from the direct manipulation list prior to completion of the drag and drop operation, comprising the steps of:

creating a group graphical object comprising all graphical objects on the direct manipulation list;

hovering said group graphical object proximate at least one other graphical object for a predetermined period of time while continuing to select said group graphical object;

after said predetermined period of time, automatically opening a menu comprising a plurality of selectable options including at least add to the direct manipulation list and delete from the direct manipulation list;

while continuing to select said group graphical object, designating at least one of said plurality of selectable options; and continuing the drag and drop operation.

2. The method of claim 1, wherein said step of hovering said group graphical object comprises:

hovering said group graphical object proximate at least a second source graphical object.

3. The method of claim 2, wherein said step of designating further comprises:

designating an option to add said at least a second source graphical object to a source list on said direct manipulation list; and adding said at least a second source graphical object to said group graphical object.

4. The method of claim 2, wherein said step of designating further comprises:

designating an option to delete said at least a second source graphical object from a source list on said direct manipulation list; and deleting said at least a second graphical source object from said group graphical object.

5. The method of claim 1, wherein said step of hovering said group graphical object comprises:

hovering said group graphical object proximate at least a first target graphical object for a predetermined period of time.

6. The method of claim 5, wherein said step of automatically opening further comprises:

automatically opening a menu comprising a plurality of selectable options including at least add to a target list and delete from a target list, said target list comprising a portion of the direct manipulation list.

7. The method of claim 6, wherein said step of designating comprises:

designating an option to add said at least a first target graphical object to said target graphical list; and adding said at least a first target object to said group graphical object.

8. The method of claim 6, wherein said step of designating comprises:

designating an option to delete said at least a first target graphical object from said target list; and deleting said at least a first target graphical object from said group graphical object.

9. The method of claim 1 in which the direct manipulation operation has been initiated in a first window wherein said step of hovering further comprises:

hovering said group graphical object proximate said at least a second graphical object in a second window separate from the first window.

10. A multi-windowed data processing system for selectively adding and deleting graphical objects from a direct manipulation list after initiating but prior to completing a drag and drop operation, comprising:

means for creating a group graphical object comprising all graphical objects on the direct manipulation list;

means for hovering said group graphical object proximate at least one other graphical object for a predetermined period of time while continuing to select said group graphical object;

means for automatically opening, after said predetermined period of time, a menu comprising a plurality of selectable options including at least add to the direct manipulation list and delete from the direct manipulation list;

means for designating, while continuing to select said group graphical object, at least one of said plurality of selectable options; and means for continuing the drag and drop operation.

11. The system of claim 10, wherein said means for hovering further comprises;

means for hovering said group graphical object proximate at least a second source graphical object.

12. The system of claim 11, wherein said means for designating further comprises:

means for designating an option to add said at least a second source graphical object to a source list on said direct manipulation list; and means for adding said at least a second source graphical object to said group graphical object.

13. The system of claim 11, wherein said means for designating further comprises:

means for designating an option to delete said at least a second source graphical object from a source list on said direct manipulation list; and means for deleting said at least a second source graphical object from said group graphical object.

14. The system of claim 10, wherein said means for hovering further comprises:

means for hovering said group graphical object proximate at least a first target graphical object for a predetermined period of time.

15. The system of claim 14, wherein said means for automatically opening further comprises:

means for automatically opening a menu comprising a plurality of selectable options including at least add to a target list and delete from a target list, said target list comprising a portion of the direct manipulation list.

16. The system of claim 15, wherein said means for designating comprises:

means for designating an option to add said at least a first target graphical object to said target list; and means for adding said at least a first target graphical object to said group graphical object.

17. The system of claim 15, wherein said means for designating comprises:

means for designating an option to delete said at least a first target graphical object from said target list; and means for deleting said at least a first target graphical object from said group graphical object.

18. The system of claim 10 in which the drag and drop operation has been initiated in a first window wherein said means for hovering further comprises:

means for hovering said group graphical object proximate said at least a second graphical object in a second window separate from the first window.

* * * * *